US011587225B2

(12) United States Patent
Dou et al.

(10) Patent No.: US 11,587,225 B2
(45) Date of Patent: *Feb. 21, 2023

(54) PATTERN INSPECTION SYSTEM

(71) Applicant: Hitachi High-Tech Corporation, Tokyo (JP)

(72) Inventors: Shuyang Dou, Tokyo (JP); Shinichi Shinoda, Tokyo (JP); Yasutaka Toyoda, Tokyo (JP); Hiroyuki Shindo, Tokyo (JP)

(73) Assignee: HITACHI HIGH-TECH CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/410,344

(22) Filed: Aug. 24, 2021

(65) Prior Publication Data

US 2021/0383524 A1 Dec. 9, 2021

Related U.S. Application Data

(63) Continuation of application No. 16/557,175, filed on Aug. 30, 2019, now Pat. No. 11,132,788.

(30) Foreign Application Priority Data

Aug. 31, 2018 (JP) .............................. JP2018-162607

(51) Int. Cl.
*G06T 7/00* (2017.01)
*G06T 7/73* (2017.01)
(Continued)

(52) U.S. Cl.
CPC ............ *G06T 7/001* (2013.01); *G06N 20/00* (2019.01); *G06T 7/11* (2017.01); *G06T 7/13* (2017.01);
(Continued)

(58) Field of Classification Search
CPC ... G06T 7/001; G06T 7/11; G06T 7/13; G06T 7/74; G06T 7/80; G06T 2207/10061;
(Continued)

(56) References Cited

U.S. PATENT DOCUMENTS 10,282,509 B2 * 5/2019 Watanabe ............. G03F 7/7065
11,132,788 B2 * 9/2021 Dou .......................... G06T 7/80
(Continued)

FOREIGN PATENT DOCUMENTS

JP  2007-003212 A  1/2007
JP  2010-157154 A  7/2010
(Continued)

OTHER PUBLICATIONS

Japanese Office Action dated Mar. 15, 2022 for Japanese Patent Application No. 2018-162607.
(Continued)

*Primary Examiner* — Molly Wilburn
(74) *Attorney, Agent, or Firm* — Volpe Koenig

(57) ABSTRACT

A pattern inspection system inspects an image of an inspection target pattern of an electronic device using an identifier constituted by machine learning, based on the image of the inspection target pattern of the electronic device and data used to manufacture the inspection target pattern. The system includes a storage unit which stores a plurality of pattern images of the electronic device and pattern data used to manufacture a pattern of the electronic device, and an image selection unit which selects a learning pattern image used in the machine learning from the plurality of pattern images, based on the pattern data and the pattern image stored in the storage unit.

9 Claims, 15 Drawing Sheets

(51) Int. Cl.
  *G06T 7/13* (2017.01)
  *G06T 7/80* (2017.01)
  *G06N 20/00* (2019.01)
  *G06T 7/11* (2017.01)

(52) U.S. Cl.
  CPC ............ *G06T 7/74* (2017.01); *G06T 7/80* (2017.01); *G06T 2207/10061* (2013.01); *G06T 2207/20081* (2013.01); *G06T 2207/20092* (2013.01); *G06T 2207/30148* (2013.01)

(58) Field of Classification Search
  CPC . G06T 2207/20081; G06T 2207/20092; G06T 2207/30148; G06T 7/0004; G06N 20/00; G06N 3/08; G06V 10/764; G06V 10/82; G06V 2201/06; G01N 21/8851; G01N 21/8806; G01N 21/95; G01N 2021/8887; G03F 7/70508; G03F 7/70625; H01L 21/67242
  See application file for complete search history.

(56) References Cited

U.S. PATENT DOCUMENTS

| | | |
|---|---|---|
| 2006/0284081 A1 | 12/2006 | Miyamoto et al. |
| 2011/0274362 A1 | 11/2011 | Isomae et al. |
| 2014/0094954 A1* | 4/2014 | Griffiths ................ B23K 26/36 700/166 |
| 2017/0047195 A1* | 2/2017 | Lee ........................ H01L 22/12 |
| 2017/0323435 A1 | 11/2017 | Minekawa et al. |
| 2018/0121592 A1* | 5/2018 | Watanabe ............ G03F 7/7065 |
| 2018/0174000 A1 | 6/2018 | Takagi et al. |
| 2018/0293721 A1* | 10/2018 | Gupta .................... G06N 20/00 |
| 2019/0228522 A1* | 7/2019 | Shinoda ................ G06N 3/0454 |
| 2019/0383753 A1* | 12/2019 | Zhang .................... H01L 22/20 |
| 2020/0219248 A1* | 7/2020 | Kaneko .............. G01N 21/8851 |

FOREIGN PATENT DOCUMENTS

| | | |
|---|---|---|
| JP | 2015-041164 A | 3/2015 |
| JP | 2016-058465 A | 4/2016 |
| JP | 2016-173615 A | 9/2016 |
| KR | 10-2017-0024024 A | 3/2017 |
| KR | 10-2017-0141255 A | 12/2017 |

OTHER PUBLICATIONS

Krizhevsky et al., ImageNet Classification with Deep Convolutional Neural Networks.

Sun et al., Optimizing OPC data sampling based on "orthogonal vector space".

Korean Office Action dated Jul. 27, 2020 for Korean Patent Application No. 10-2019-0105674.

* cited by examiner

FIG. 21A
........................
........................
1,0,0,2,  0,0, 400,0, 400,200, 0, 200, 0,0,
           A    B      C        D     A
FIG. 21B
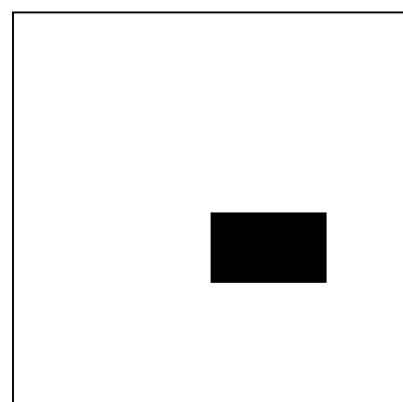
FIG. 21C
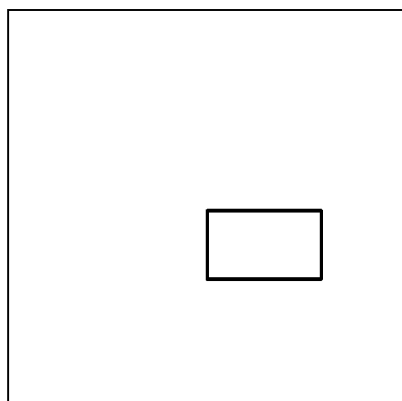
FIG. 21D
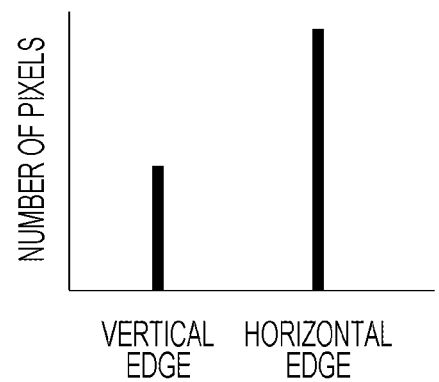

PATTERN INSPECTION SYSTEM

CROSS REFERENCE TO RELATED APPLICATION

This application is a Continuation Application of U.S. patent application Ser. No. 16/557,175 filed Aug. 30, 2019 which claims benefit of Japanese Patent Application No. 2018-162607 filed on Aug. 31, 2018 which are incorporated herein by reference.

BACKGROUND OF THE INVENTION

1. Field of the Invention

The present invention relates to a pattern inspection system using a charged particle beam device or the like, and more particularly, to a pattern inspection system which executes machine learning based on image information.

2. Description of the Related Art

In recent years, in a field of a semiconductor inspection or the like, an image analysis technology has been used, which extracts a feature value from an image, compares and collates the feature value with information registered in a database or the like in advance, and determines an object. A neural network or a support vector machine is known as an algorithm of machine learning which determines an object. In any method, identification accuracy largely varies depending on which feature value is selected, and thus, a selection method of the feature value is important.

In recent years, a deep learning device called Convolutional Neural Network (CNN) has been developed and is attracting attention (Alex Krizhevsky, Ilya Sutskever, and Geoffrey E Hinton, "ImageNetClassification with Deep Convolutional Neural Networks", Advances InNeural Information Processing Systems, Vol. 25, pp. 1106-1114, 2012.). The CNN is a kind of machine learning device, in which a system automatically extracts and learns a feature of an image, and executes extraction of an object image included in the image, determination of an object, classification of the image, or the like. In a support vector machine or the like of the related art, selection of the feature value required by machine learning can be automatically extracted from learning data, and thus, extremely high image analysis performance is exerted.

However, in order to improve the image analysis performance by the CNN, it is necessary to exhaustively learn a variation of an analysis object, and thus, there is a problem that an operation is difficult in an application which requires time and effort to acquire the learning data like the semiconductor inspection.

As a measure to expand the variation of the analysis object and reduce the data of the machine learning, there is Optical Proximity Correction (OPC) model creation. (Sun, Yuyang, et al. "Optimizing OPC data sampling based on" orthogonal vector space"." Optical Microlithography XXIV. Vol. 7973. International Society for Optics and Photonics, 2011.). This is a model which is used to simulate how a circuit design drawing of a semiconductor is formed on a silicon wafer through a semiconductor manufacturing apparatus, and executes the machine learning on a relationship between the circuit design drawing and an SEM photograph actually manufactured on the wafer. In Sun, Yuyang, et al. "Optimizing OPC data sampling based on" orthogonal vector space"." Optical Microlithography XXIV. Vol. 7973. International Society for Optics and Photonics, 2011, in order to widen the variation of the analysis object, a method is proposed in which circuit design data is referenced to analyze a variation of a circuit shape so as to determine a learning object.

SUMMARY OF THE INVENTION

In a case where machine learning is used for an image inspection of a semiconductor, in order to cope with a variation of a photographing condition of a Scanning Electron Microscope (SEM) used for imaging of the semiconductor, a variation of a circuit shape, a variation of a fluctuation of a semiconductor manufacturing process, or a variation of deformation of the circuit shape due to a circuit formation position on a semiconductor device, it is necessary to prepare a lot of image data. In addition, it is necessary to create a correct inspection result (hereinafter, referred to as a true value) to be paired with each piece of image data, and creating true values corresponding to a large amount of learning data requires manual work and a time. Furthermore, a large amount of learning work using a calculator may take several weeks to several months and times. The learning work interferes with an operation of a production line, and thus, is difficult to be used. Therefore, a method of selecting minimum data necessary to achieve target inspection performance is desired.

Accordingly, the present invention provides a pattern inspection system capable of shortening a learning time by saving time and effort on a true value creation operation of learning data and reducing an amount of the learning data.

An aspect of the present invention provides a pattern inspection system which inspects an image of an inspection target pattern of an electronic device using an identifier constituted by machine learning, based on the image of the inspection target pattern of the electronic device and data used to manufacture the inspection target pattern, the system including: a storage unit which stores a plurality of pattern images of the electronic device and pattern data used to manufacture a pattern of the electronic device; and an image selection unit which selects a learning pattern image used in the machine learning from the plurality of pattern images, based on the pattern data and the pattern image stored in the storage unit.

Another aspect of the present invention provides a pattern inspection system which inspects an image of an inspection target pattern of an electronic device using an identifier constituted by machine learning, based on the image of the inspection target pattern of the electronic device and data used to manufacture the inspection target pattern, the system including: a storage unit which stores pattern data used to manufacture a pattern of the electronic device and photographing condition data of the image of the inspection target pattern; and a photographing position selection unit which selects a photographing position of a learning pattern image on the electronic device used in the machine learning, based on the pattern data and the photographing condition data stored in the storage unit.

Still another aspect of the present invention provides a pattern inspection system which inspects an image of an inspection target pattern of an electronic device using an identifier constituted by machine learning, based on the image of the inspection target pattern of the electronic device and data used to manufacture the inspection target pattern, the system including: a storage unit which stores pattern data used to manufacture a pattern image of the electronic device and a pattern of the electronic device and photographing condition data of the image of the inspection target pattern; and an image selection unit which selects a learning pattern image used in the machine learning, based on the pattern data, the pattern image, and the photographing condition data stored in the storage unit.

According to the present invention, it is possible to provide the pattern inspection system capable of shortening a learning time by saving time and effort on a true value creation operation of learning data and reducing an amount of the learning data.

Problems, configurations, and effects other than those described above will be apparent from a description of the embodiments below.

BRIEF DESCRIPTION OF THE DRAWINGS

FIGS. 21A to 21D are schematic diagrams for explaining a calculation of vertical and horizontal edge pixels of a pattern, FIG. 21A illustrates a vertex coordinate in design data, FIG. 21B illustrates a design data image, FIG. 21C illustrates an edge image, and FIG. 21D illustrates the numbers of pixels of the vertical edge and the horizontal edge.

DESCRIPTION OF THE PREFERRED EMBODIMENTS

An object of an image generation unit constituting a pattern inspection system illustrated in embodiments described below is to reduce an amount of learning data in a semiconductor inspection using machine learning and shorten a learning time. Moreover, as a specific example thereof, an example of generating an image data set for learning using design data and an SEM photographing condition will be illustrated.

In the present specification, an apparatus having a function of generating learning data in the semiconductor inspection using the machine learning, that is, the pattern inspection system will be described. For example, a charged particle beam device used as the pattern inspection system includes a focused ion beam (FIB) device which scans a sample with an ion beam to form an image, a scanning electron microscope (SEM) which scans a sample with an electron beam to form an image, a scanning electron microscope (Critical Dimension-Scanning Electron Microscope: CD-SEM) for a length measurement which is a type of measurement apparatus, or the like. However, in order to measure a pattern progressing with miniaturization with high accuracy, an extremely high magnification is required, and thus, it is desirable to use the SEM which surpasses the FIB device in terms of resolution in general.

Figure 19:
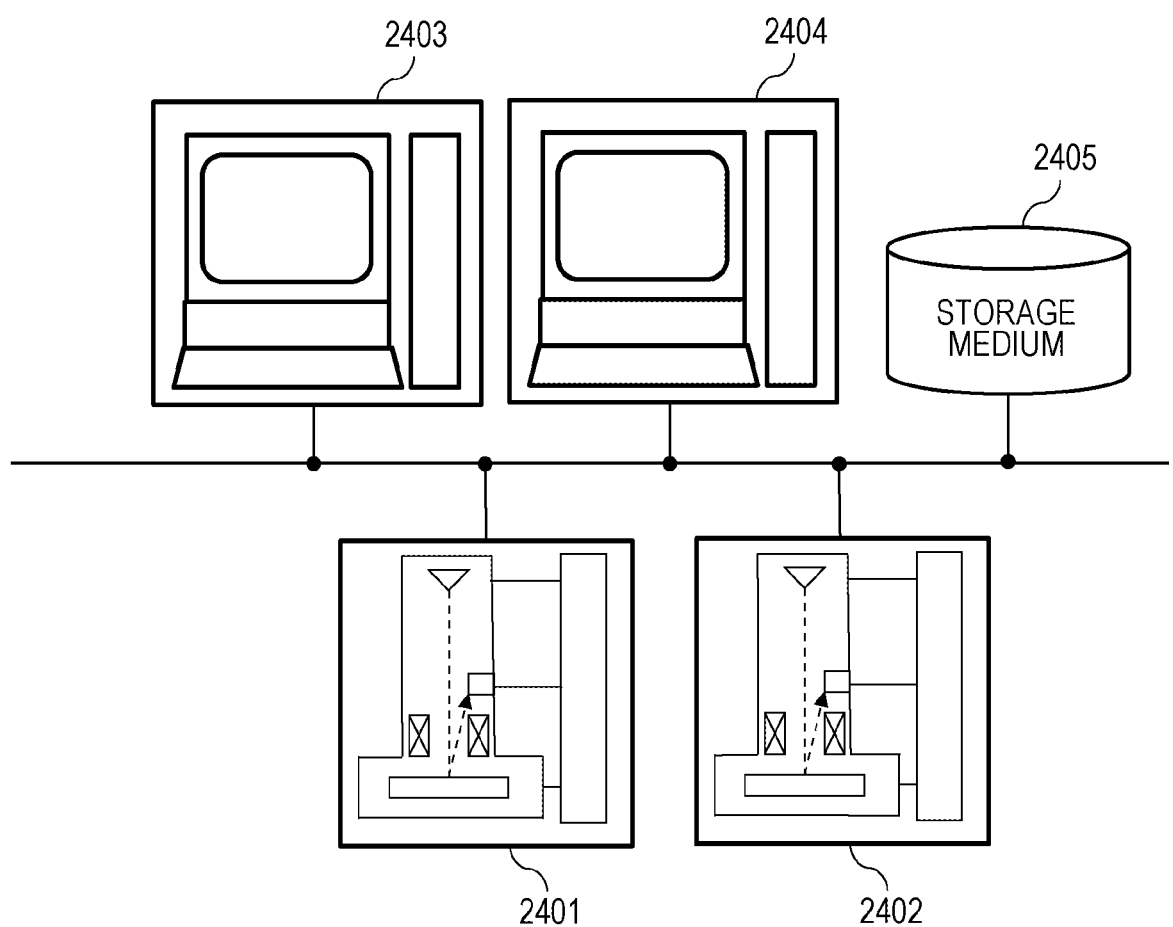
FIG. 19 is an overall schematic configuration diagram of a semiconductor measurement system.

FIG. 19 is an overall schematic configuration diagram of a semiconductor measurement system, and is a schematic explanatory diagram of a measurement/inspection system in which a plurality of measurement or inspection devices are connected to a network. In the semiconductor measurement system illustrated in FIG. 19, a CD-SEM 2401 (also referred to as a length measurement SEM) which mainly measures a pattern dimension of a semiconductor wafer, a photo-mask, or the like, and a defect inspection device 2402 which acquires an image by irradiating a sample with an electron beam and extracts a defect based on a comparison between the image and a reference image registered in advance are connected to a network. In addition, a condition setting device 2403 which sets a measurement position, a measurement condition, or the like to design data of a semiconductor device, a simulator 2404 which simulates performance of a pattern based on a manufacturing condition or the like of a semiconductor manufacturing apparatus, and a storage medium 2405 in which layout data of the semiconductor device or the design data in which the manufacturing condition is registered is stored are connected to the network.

For example, the design data is expressed in a GDS format, an OASIS format, or the like and is stored in a predetermined format. In addition, the design data can be of any type as long as software which displays the design data can display the format and can be handled as graphic data. In addition, the storage medium 2405 may be built in a measurement device, a controller of an inspection device, the condition setting device 2403, or the simulator 2404. In addition, the CD-SEM 2401 and the defect inspection device 2402 are provided with respective controllers, and thus, a control necessary for each device is executed. However, the controller may be equipped with a function of the simulator 2404 or a setting function such as a measurement condition.

In the SEM, electron beams emitted from an electron source are focused by a plurality of stages of lenses, and the sample is scanned with the focused electron beams one-dimensionally or two-dimensionally by a scanning deflector. Secondary electrons (SE) or backscattered electrons (BSE) emitted from the sample by the scanning of the electron beam are detected by a detector and is stored in the storage medium such as a frame memory in synchronization with the scanning of the scanning deflector. An image signal stored in this frame memory is integrated by an arithmetic device mounted in the controller. In addition, the scanning by the scanning deflector is possible for any size, position, and direction.

The control as described above is executed by the controller of each SEM, and an image or signal obtained by a result of the scanning of the electron beam scan is sent to the condition setting device 2403 via a communication line network. In addition, in the present example, the controller which controls the SEM and the condition setting device 2403 are described separately. However, the present invention is not limited to this, the device control and the measurement processing may be collectively executed by the condition setting device 2403, and the control of the SEM and the measurement processing may be executed together in each controller.

Moreover, a program for executing measurement processing is stored in the condition setting device 2403 or the controller, and a measurement or calculation is executed according to the program.

Further, the condition setting device 2403 has a function of creating a program (a recipe), which controls the operation of the SEM, based on the design data of the semiconductor, and functions as a recipe creation unit. Specifically, by setting a position for executing processing required for the SEM such as a desired measurement point, auto focus, auto stigma, or an addressing point on the design data, contour line data of a pattern, or design data subjected to the simulation, a program for automatically controlling a sample stage of the SEM, a deflector, or the like is created, based on the setting.

Hereinafter, with reference to the drawings, an embodiment will be described with a CD-SEM (also referred to as the length measurement SEM) as an example of the charged particle beam device.

First Embodiment

Figure 20:
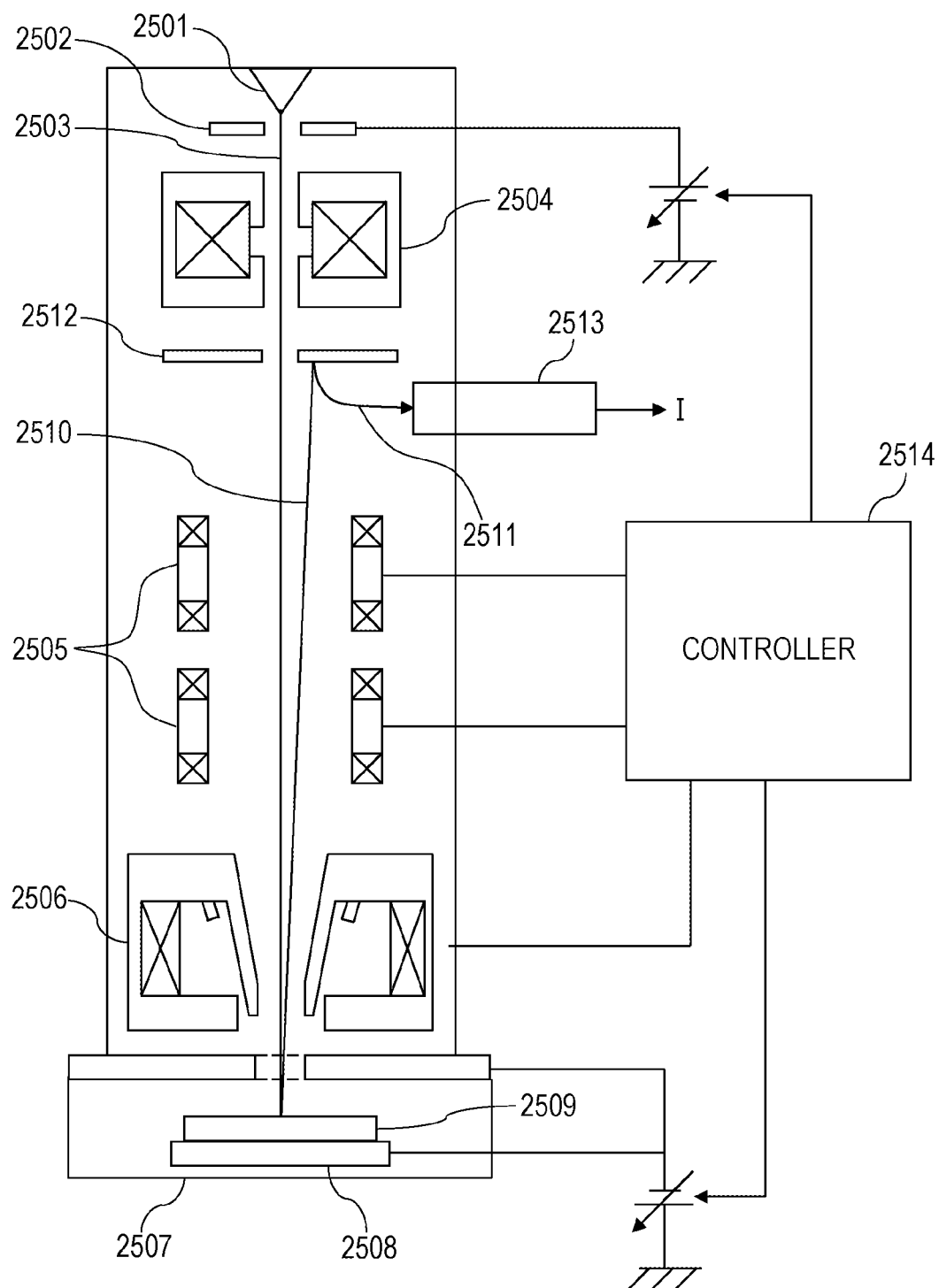
FIG. 20 is a schematic configuration diagram of a scanning electron microscope.

FIG. 20 is a schematic configuration diagram of the scanning electron microscope. An electron beam 2503 which is extracted from an electron source 2501 by an extraction electrode 2502 and is accelerated by an acceleration electrode (not illustrated) is narrowed by a condenser lens 2504 which is a form of a focusing lens, and then, a sample 2509 is scanned with the electron beam 2503 one-dimensionally or two-dimensionally by a scanning deflector 2505. The electron beam 2503 is decelerated by a negative voltage applied to an electrode built in a sample stage 2508 in a chamber 2507 and is focused by a lens action of an objective lens 2506 to irradiate the sample 2509.

If the sample 2509 is irradiated with the electron beam 2503, an electron 2510 including a secondary electron and a backscattered electron are emitted from an irradiation location. The emitted electron 2510 is accelerated in an electron source direction by an acceleration action based on the negative voltage applied to the sample, collides with a conversion electrode 2512, and generates a secondary electron 2511. The secondary electron 2511 emitted from the conversion electrode 2512 is captured by a detector 2513 and an output I of the detector 2513 is changed depending on an amount of the captured secondary electrons. A luminance of a display device (not illustrated) is changed depending on the output I. For example, in a case where a two-dimensional image is formed, an image of a scanning area is formed by synchronizing a deflection signal to the scanning deflector 2505 and the output I of the detector 2513 with each other. In the example illustrated in FIG. 20, an example is described in which the electron 2510 emitted from the sample 2509 is subjected to one-end conversion by the conversion electrode 2512 for detection. However, of course, the present invention is not limited to the configuration, and it is also possible to dispose a detection surface of an electron multiplying tube or the detector on a trajectory of the accelerated electron. A controller 2514 has a function which controls each configuration of the scanning electron microscope and also forms an image based on the detected electron, and a function which measures a pattern width of a pattern formed on the sample based on an intensity distribution of the detected electron referred to as a line profile.

Figure 22:
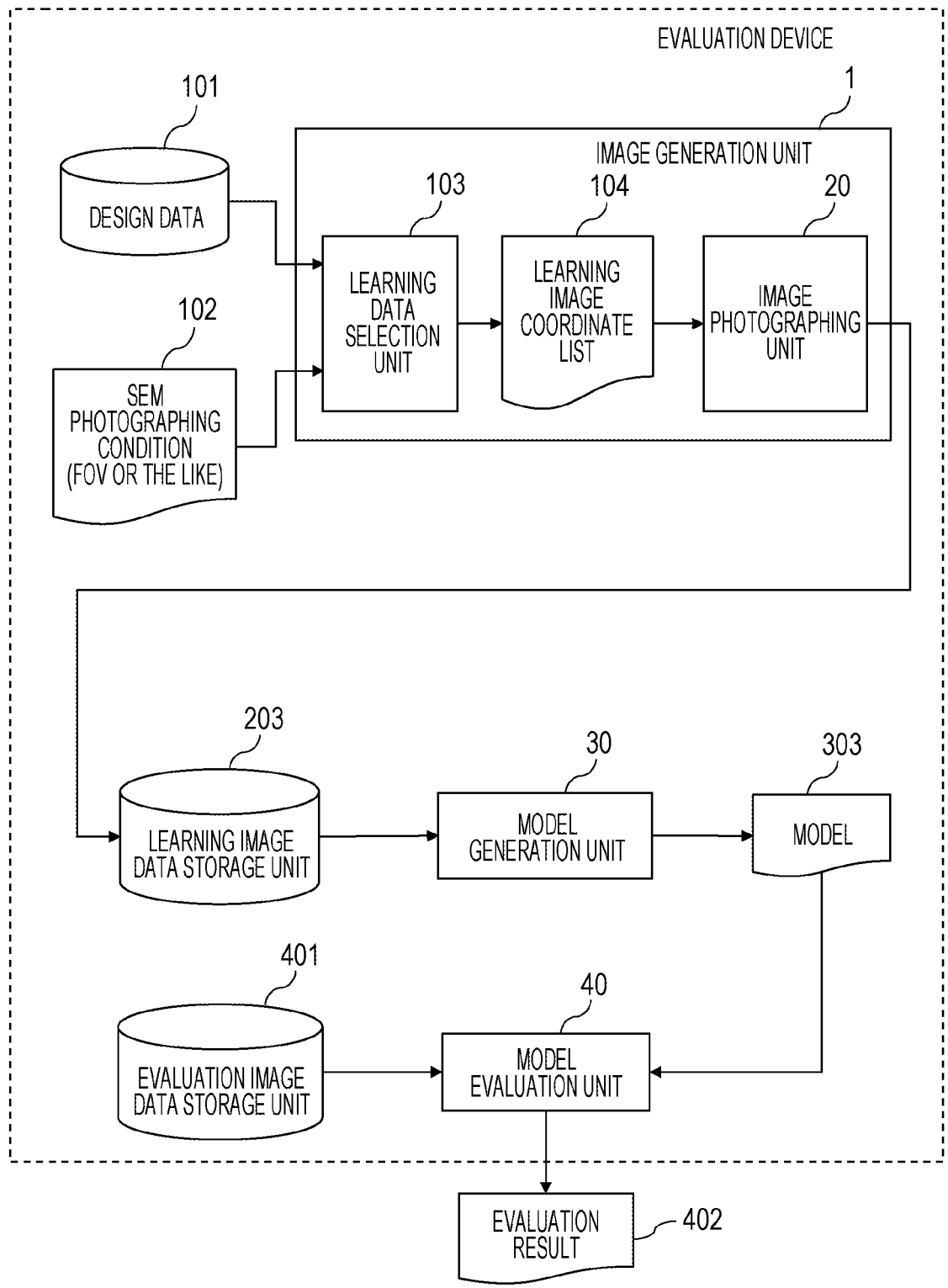
FIG. 22 is an overall schematic configuration diagram of the image generation unit and an evaluation device.

Next, the overall schematic configuration diagram of generation and evaluation devices of learning image data of the machine learning and evaluation device is illustrated in FIG. 22. Design data 101 and an SEM photographing condition 102 are input to an image generation unit 1, and the learning image data is generated and is stored in a learning image data storage unit 203. A model generation unit 30 learns the learning image data and generates a model 303 for executing the image inspection. A model evaluation unit 40 extracts image data from an evaluation image data storage unit 401 using the model 303, executes evaluation, and generates an evaluation result 402. As illustrated by dotted lines in FIG. 22, the evaluation device includes the design data 101, the SEM photographing condition 102, the image generation unit 1, the learning image data storage unit 203, the model generation unit 30, the model 303, the model evaluation unit 40, and the evaluation image data storage unit 401.

One aspect of each of the image generation unit 1, the model generation unit 30, and the model evaluation unit 40 will be described. The image generation unit 1, the model generation unit 30, and the model evaluation unit 40 can be executed by an arithmetic device which is built in the controller 2514 or has an image processing function, or can execute the image generation by an external arithmetic device (for example, condition setting device 2403) via a network.

Figure 1:
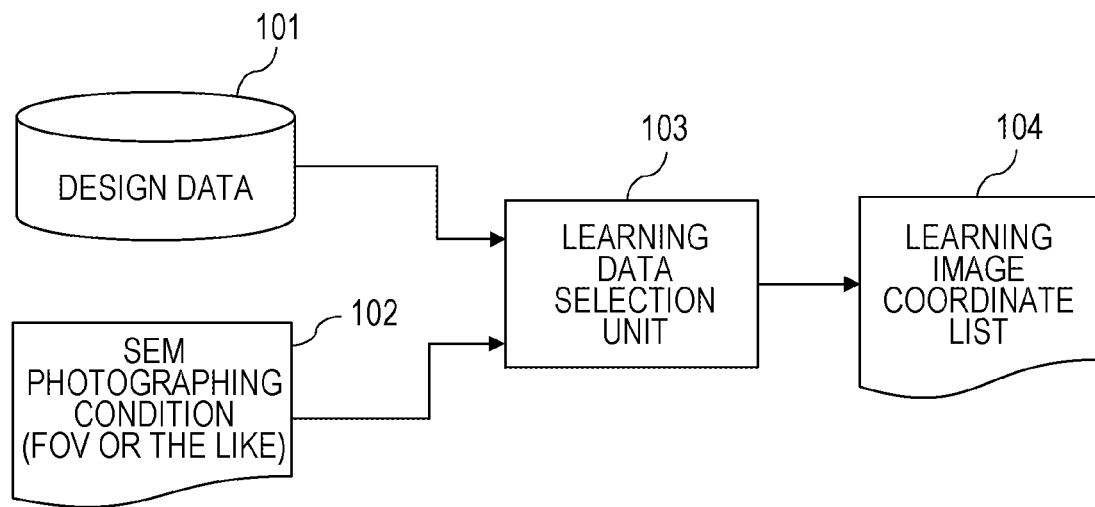
FIG. 1 is a diagram illustrating an outline of a learning data selection unit constituting an image generation unit according to an embodiment of the present invention.

FIG. 1 is a diagram illustrating an outline of the learning data selection unit constituting the image generation unit 1 according to an embodiment of the present invention. That is, FIG. 1 is a diagram explaining an example of learning data selection unit 103 which creates an SEM photographing coordinate list, in order to generate the learning image data of the machine learning. The learning data selection unit 103 uses the design data 101 and the SEM photographing condition 102 to obtain a coordinate of the photographing position in order to acquire an image suitable for learning and outputs the coordinate as a learning image coordinate list 104.

Figure 4:
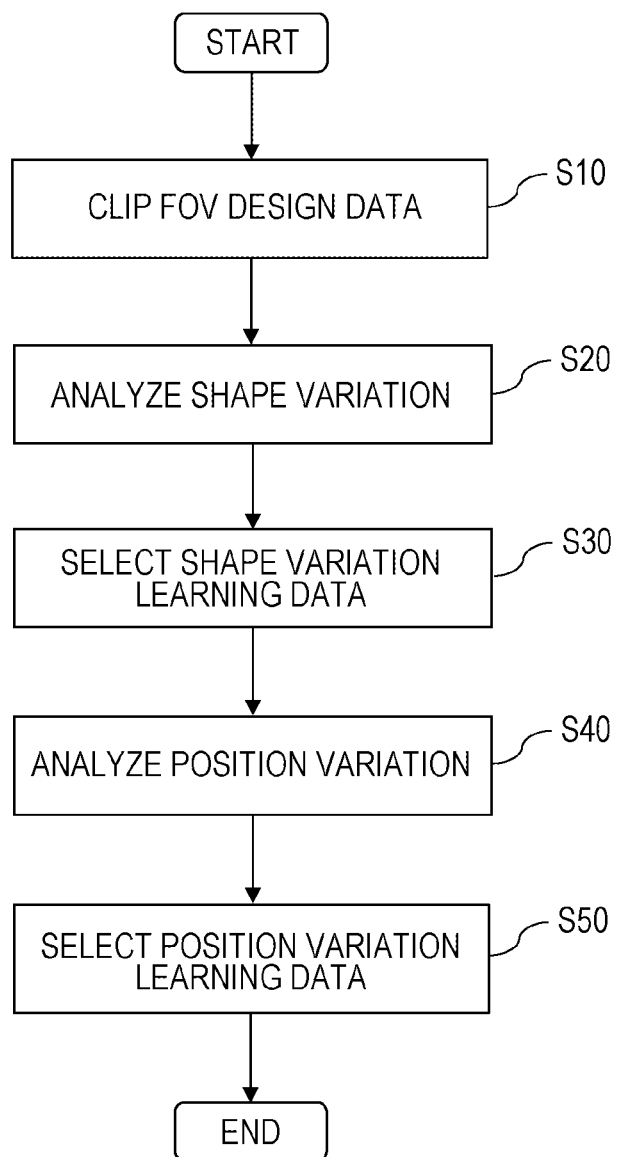
FIG. 4 is a flowchart illustrating a processing flow of the learning data selection unit illustrated in FIG. 1.

FIG. 4 is a flowchart illustrating a processing flow of the learning data selection unit 103 illustrated in FIG. 1. In a case where the machine learning is applied to the image inspection, it is necessary to exhaustively learn a variation of a subject which becomes an inspection target. In this example, an example of efficiently selecting the learning data so as to cover the variation of the pattern shape on the semiconductor device using the design data of the semiconductor device and the photographing conditions of the SEM will be described. In the case of a semiconductor, an amount of deformation of a pattern shape varies depending on a formation position of the pattern on the semiconductor device due to a fluctuation of a manufacturing process, and thus, a selection in consideration of the pattern formation position is effective in addition to the variation of the pattern shape. Hereinafter, after the outline is described, details of each processing will be described.

As illustrated in FIG. 4, in Step S10, first, the learning data selection unit 103 executes field of view (FOV: also referred to as an imaging field of view) design data clipping processing. That is, the design data 101 is clipped at a position on the design data 101 corresponding to the SEM photographing condition 102 and by an image size to be acquired. For example, in a case where the FOV is 2 μm at photographing positions X and Y, the design data 101 is clipped with a size of 2 μm about X and Y coordinates. After the design data 101 is drawn in advance, the image of the design data 101 may be clipped, or after a clip region is obtained, the design data corresponding to the clip region may be drawn.

Sequentially, in Step S20, the learning data selection unit 103 executes shape variation analysis processing. That is, features relating to the shape of the pattern and the density of the pattern are determined from the design data image clipped in Step S10.

Moreover, in Step S30, the learning data selection unit 103 executes shape variation learning data selection processing. That is, the learning data selection unit 103 selects one or more patterns suitable for the learning data, using an index obtained from the shape of the pattern and the density of the pattern obtained in Step S20.

Next, in Step S40, the learning data selection unit 103 executes position variation analysis processing. That is, the pattern of the same shape of the pattern selected in Step S30 is detected from the design data 101. In the position variation analysis processing, coordinate positions of one or more isomorphic patterns are obtained.

In Step S50, the learning data selection unit 103 executes position variation learning data selection processing. That is, the learning data selection unit 103 selects a pattern suitable for the learning data using the coordinate position of the isomorphic pattern obtained in Step S40.

The above processing is executed on all local design data clipped from the design data 101. In a case where the FOV size is small due to a limitation of the photographing condition of the SEM, analysis of a large amount of clipped design data is required, and thus, the number of analyzes may be limited. For example, a preset number of coordinates may be randomly selected, and only design data corresponding to the coordinates may be limited and analyzed, or coordinates obtained by sampling design data at predetermined intervals may be selected, and only the design data corresponding to the coordinates may be limited and analyzed.

Figure 5:
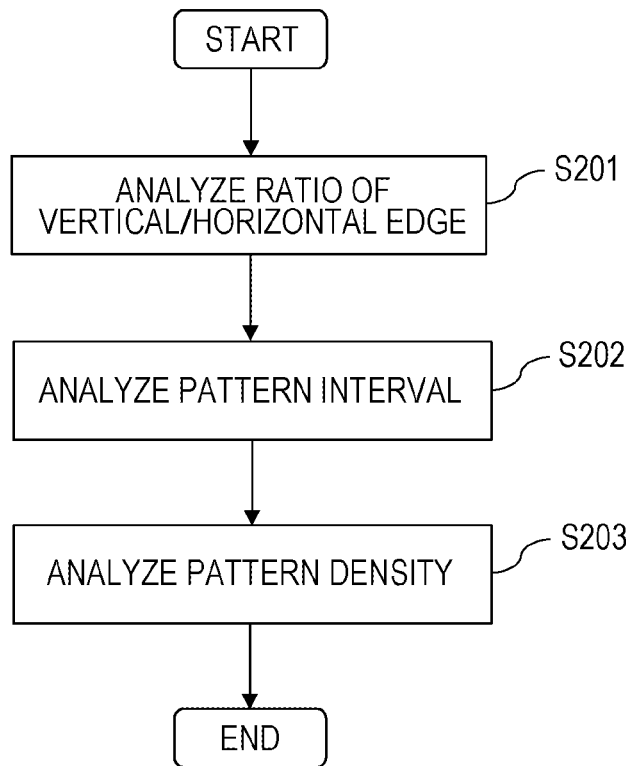
FIG. 5 is a flowchart illustrating a detailed flow of a shape variation analysis in Step S20 of FIG. 4.

FIG. 5 is a flowchart illustrating a detailed flow of the shape variation analysis in Step S20 of FIG. 4. In Step S201, the learning data selection unit 103 executes vertical/horizontal edge ratio analysis processing. That is, the learning data selection unit 103 calculates a ratio between the vertical edge and the horizontal edge of the pattern using the design data image. Since the design data is mainly a rectangular pattern in a vertical direction and a horizontal direction, a tendency of the pattern shape can be ascertained from the ratio of the vertical edge and the horizontal edge.

In the following Step S202, the learning data selection unit 103 executes pattern interval analysis processing. That is, the learning data selection unit 103 calculates a width and an interval of the pattern from the design data image.

Moreover, in Step S203, the learning data selection unit 103 executes pattern density analysis processing. That is, the learning data selection unit 103 calculates the density of the pattern using the design data image created from the design data. The pattern density can be calculated using the number of patterns, an area of the pattern, or the like.

Figure 6:
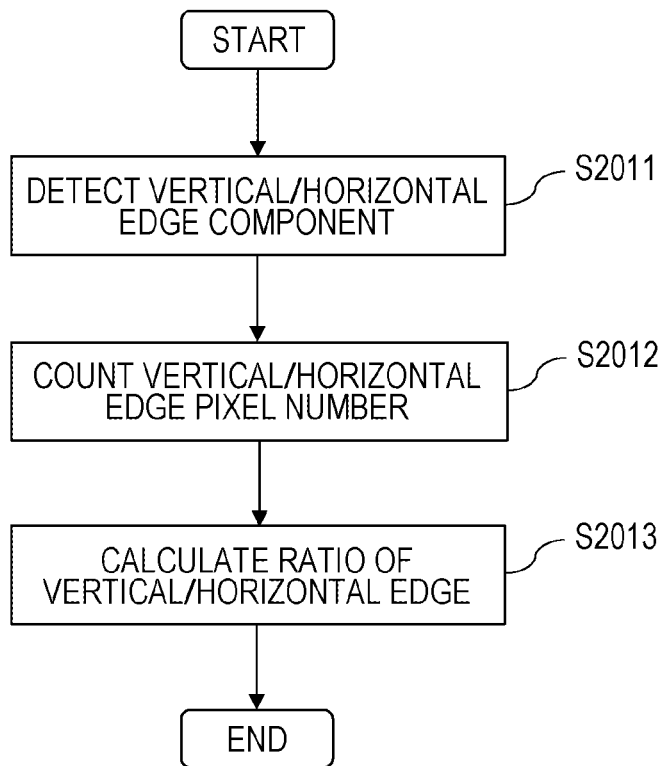
FIG. 6 is a flowchart illustrating a detailed flow of a vertical/horizontal edge ratio analysis in Step S201 of FIG. 5.

FIG. 6 is a flowchart illustrating a detailed flow of the vertical/horizontal edge ratio analysis in Step S201 of FIG. 5. As illustrated in FIG. 6, in Step S2011, vertical/horizontal edge component detection processing of detecting the number of vertical edges and horizontal edges from the design data is executed.

In Step S2012, vertical/horizontal edge pixel number count processing of counting the number of pixels of the vertical/horizontal edge component detected in Step S2011 is executed.

In Step S2013, vertical/horizontal edge ratio calculation processing of calculating a ratio of vertical/horizontal edges from the vertical/horizontal edge pixels counted in Step S2012 is executed.

Here, FIGS. 21A to 21D are schematic diagrams for explaining a calculation of vertical and horizontal edge pixels of the pattern from the design data. Based on vertex coordinates A, B, C, and D of a closed figure which is information of the design data illustrated in FIG. 21A, the design data image illustrated in FIG. 21B can be created. In this example, since there is a pattern in the closed figure, the inside of the closed figure is painted in black, and the outside of the closed figure without the pattern is painted in white. By executing edge detection on the design data image illustrated in FIG. 21B, an edge image illustrated in FIG. 21C can be obtained. This corresponds to the vertical/horizontal edge component detection processing in Step S2011 illustrated in FIG. 6. By separately counting the number of edge pixels included in a vertical line and the number of edge pixels included in a horizontal line from the edge image illustrated in FIG. 21C, it is possible to obtain the number of pixels of the vertical edge and the horizontal edge illustrated in FIG. 21D. This corresponds to the vertical/horizontal edge pixel number counting process in Step S2012 illustrated in FIG. 6. The ratio of vertical/horizontal edges can be calculated using the number of pixels of the vertical/horizontal edges.

Figure 7:
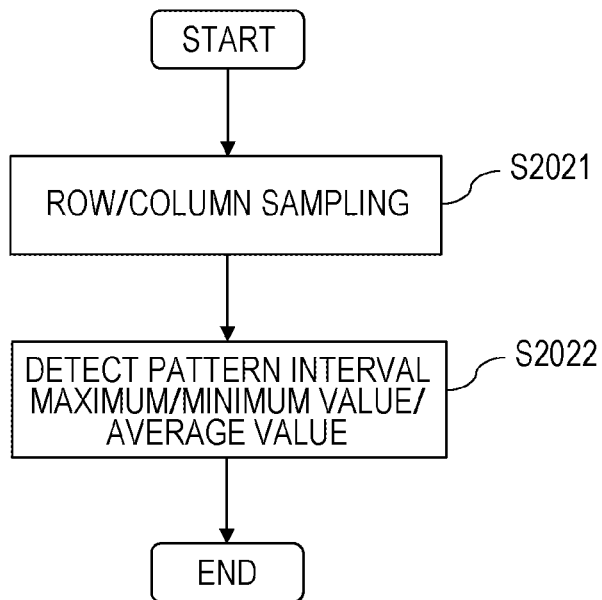
FIG. 7 is a flowchart illustrating a detailed flow of a pattern interval analysis in Step S202 of FIG. 5.

FIG. 7 is a flowchart illustrating a detailed flow of a pattern interval analysis in Step S202 of FIG. 5. First, in Step S2021, the design data image is searched by row/column sampling in a row direction (x direction) and a column direction (y direction) to detect presence/absence of the pattern, and the width of the pattern and the interval thereof are calculated and stored. The search may be performed for each row and each column, or the processing time may be shortened by skipping every several rows and several columns.

In Step S2022, pattern interval maximum/minimum value/average value detection processing is executed. That is, in Step S2021, the maximum value, the minimum value, and the average value are calculated based on the width and the interval of the pattern stored by the row/column sampling.

Figure 8:
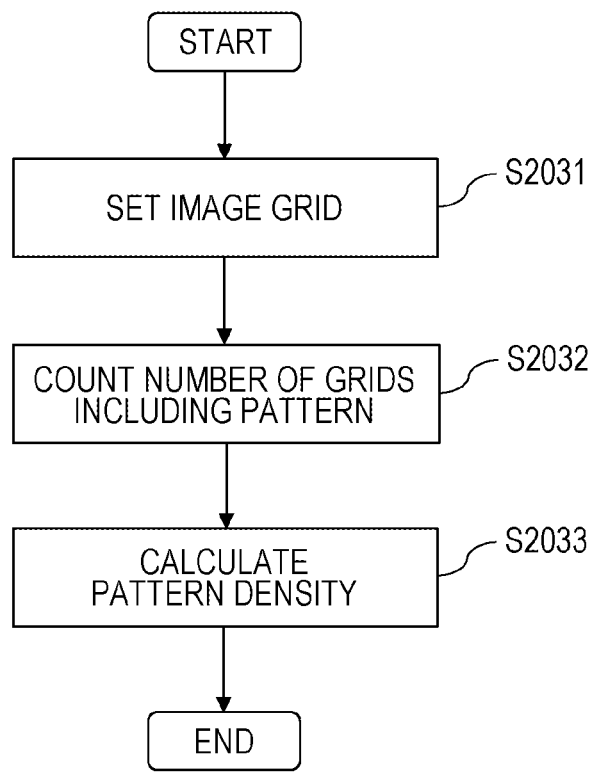
FIG. 8 is a flowchart illustrating a detailed flow of a pattern density analysis in Step S203 of FIG. 5.

FIG. 8 is a flowchart illustrating a detailed flow of the pattern density analysis in Step S203 of FIG. 5. In Step S2031, the design data image is generated from the design data, and image grid setting processing of setting a Grid to the design data image is executed.

In Step S2032, the number of Grids including the patterns is counted, and in Step S2033, the pattern densities of all Grids are calculated.

Figure 9:
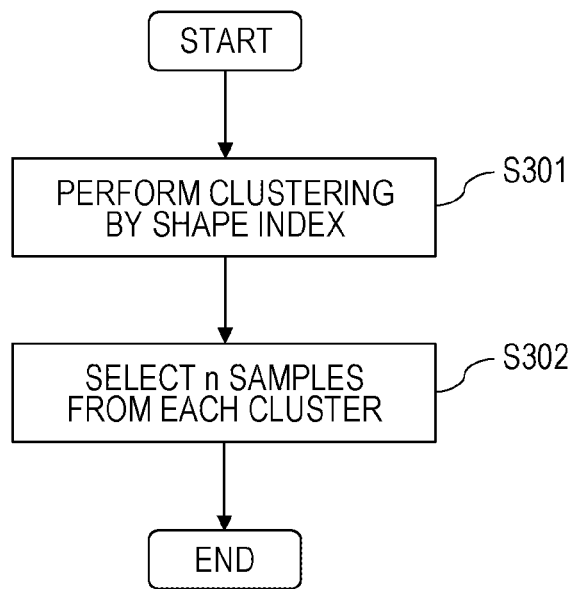
FIG. 9 is a flowchart illustrating a detailed flow of learning data selection processing by a shape variation in Step S30 of FIG. 4.

FIG. 9 is a flowchart illustrating a detailed flow of the learning data selection processing by the shape variation in Step S30 of FIG. 4. In the shape variation learning data selection processing, the learning data (sample) in consideration of the shape variation is selected using the ratio of vertical/horizontal edges, the pattern interval, and a value of the pattern density.

As illustrated in FIG. 9, first, in Step S301, the learning data selection unit 103 executes shape clustering processing and clusters the shape indices using the ratio of vertical/horizontal edges, the pattern interval, and the value of the pattern density, and thus, divides the shape indices into one or more classes are divided. For example, a method of the clustering can be realized by a known technique such as a k-means method. Subsequently, in Step S302, the learning data selection unit 103 selects n (n≥1) samples from each cluster. It is desirable to select a sample suitable for the learning data so as to be exhaustively unbiased with respect to the shape or density of the pattern. Therefore, preferably, the sample is selected so that a difference between the ratio of vertical/horizontal edges, the pattern interval, and the value of the pattern density is large between the samples, so as not to be biased toward the sample having the same tendency. In a case where a sufficient number of samples can be selected, the sample may be selected randomly. For example, in a case where the number of the samples is small, the sample may be selected so that the difference between the ratio of vertical/horizontal edges, the pattern interval, and the value of the pattern density is large between the samples, and in a case where the number of samples to be selected is large, the sample may be randomly selected. That is, the selection method may be switched depending on the number of samples. The number of samples may be determined in advance by default, or may be set by a user. The number of samples may be determined using a conversion table based on statistical processing or an experimental value using the ratio of vertical/horizontal edges, the pattern interval, and the value of the density in pattern variation analysis processing of the design data.

Figure 10:
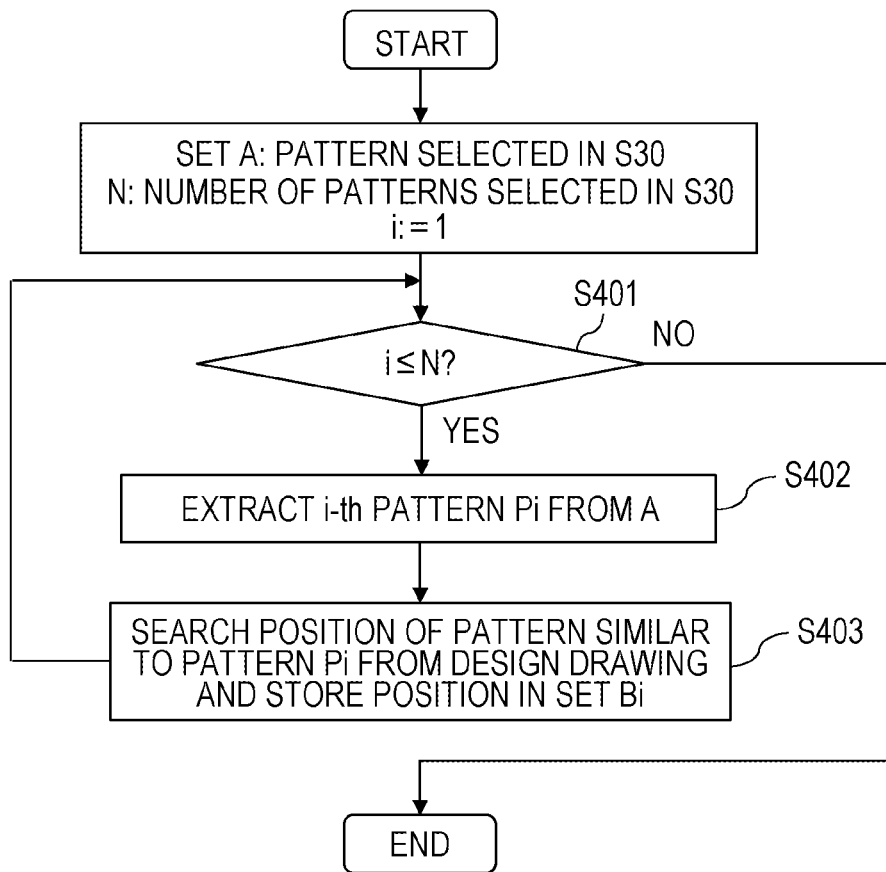
FIG. 10 is a flowchart illustrating a detailed flow of a position variation analysis in Step S40 of FIG. 4.

FIG. 10 is a flowchart illustrating a detailed flow of the position variation analysis in Step S40 of FIG. 4. In the position variation analysis processing, the design data is searched based on the shapes of all the samples selected in the shape variation learning data selection processing in Step S30 so as to detect an isomorphic pattern, and the position coordinate thereof is stored.

Specifically, as illustrated in FIG. 10, when the pattern selected in Step S30 is indicated by set A and the number of the patterns selected in Step S30 is indicated by N, i is set to 1, and in Step S401, the learning data selection unit 103 determines whether or not i≤N is satisfied. As a result of the determination, if i exceeds N, the processing ends. Meanwhile, as the result of the determination, if i≤N, the step proceeds to Step S402.

In Step S402, the learning data selection unit 103 extracts the i-th pattern Pi from the set A, and the step proceeds to Step S403.

In Step S403, the learning data selection unit 103 searches a position of a pattern similar to the pattern Pi from a design drawing (design data), stores the position in a set Bi, and returns to Step S401 so as to repeat the processing.

Moreover, the detection of the isomorphic pattern can be realized by template matching which uses the image of the sample as a template. In a case where a similarity of an image obtained by a known technique such as a normalized correlation is higher than a specific threshold value, the position coordinate is stored as the isomorphic pattern. It is also conceivable to determine the detection position assumed on a wafer. A plurality of Chips are generated on the wafer based on the design data. The Chips have the same circuit pattern. Accordingly, for example, even in a case where there is no similar pattern on the design data of the Chip, the plurality of Chips are generated on the wafer, and thus, there must be a plurality of isomorphic patterns, and it is also conceivable to store the detection position of the isomorphic pattern assuming them. In other words, in the circuit patterns (the circuit patterns of all Chips are the same as each other) of the plurality of Chips formed on the wafer, the feature shape (feature value) of the circuit pattern in the FOV, from among the circuit patterns of the respective Chips, does not exist in the other circuit patterns in the Chips by the setting of the FOV, and the feature shape (the feature value) is the same as each other in the circuit patterns of all the Chips formed on the wafer.

Figure 11:
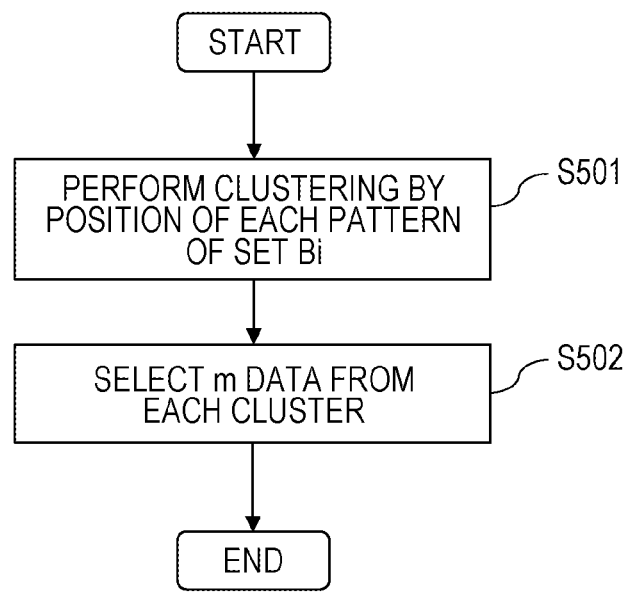
FIG. 11 is a flowchart illustrating a detailed flow of the learning data selection processing by a position variation in Step S50 of FIG. 4.

FIG. 11 is a flowchart illustrating a detailed flow of the learning data selection processing by the position variation in Step S50 of FIG. 4. In Step S501, the learning data selection unit 103 clusters data of a plurality of position coordinates where the isomorphic pattern stored for each pattern exists, and divides the data into one or more classes. The clustering can be realized in the same manner as Step S301 described above. Subsequently, in Step S502, m (m≥1) samples are randomly selected from the divided classes. Moreover, an image coordinate of the selected sample is output as the learning image coordinate list 104.

When a pattern is transferred to a wafer, the pattern shape is changed in a process fluctuation even if the pattern is an isomorphic pattern on design data. Therefore, in the position variation learning data selection processing (Step S50), the fluctuation of the generated pattern shape is added as the learning data, and thus, data having a different position coordinate in the isomorphic pattern is selected.

In this method, it is possible to obtain a sample suitable for the learning which contributes to generalization performance by eliminating a bias in the pattern shape by the shape variation analysis processing (Step S20) and the shape variation learning data selection processing (Step S30). In addition, by means of the position variation analysis processing (Step S40) and the position variation learning data selection processing (Step S50), it is possible to create the learning data which contributes to the generation of a robust identifier with respect to the shape fluctuation which actually occurs. Here, for example, it is conceivable to execute the learning by adding the learning data subjected to image processing such as distortion of the pattern shape by augmentation and to generate the identifier robust the shape fluctuation. However, in a case where the distortion of the added shape is different from the degree of distortion which actually occurs, the identification performance may deteriorate.

Meanwhile, in the present method, since the fluctuation of the actually generated shape is added as the learning data, the identification performance can be stably improved.

Figure 2:
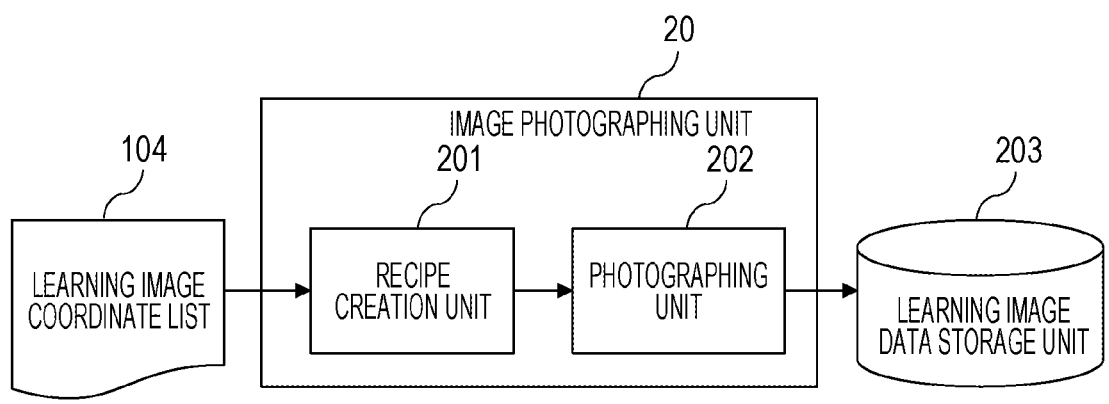
FIG. 2 is a diagram illustrating an outline of an image photographing unit constituting the image generation unit according to the embodiment of the present invention.
Figure 12:
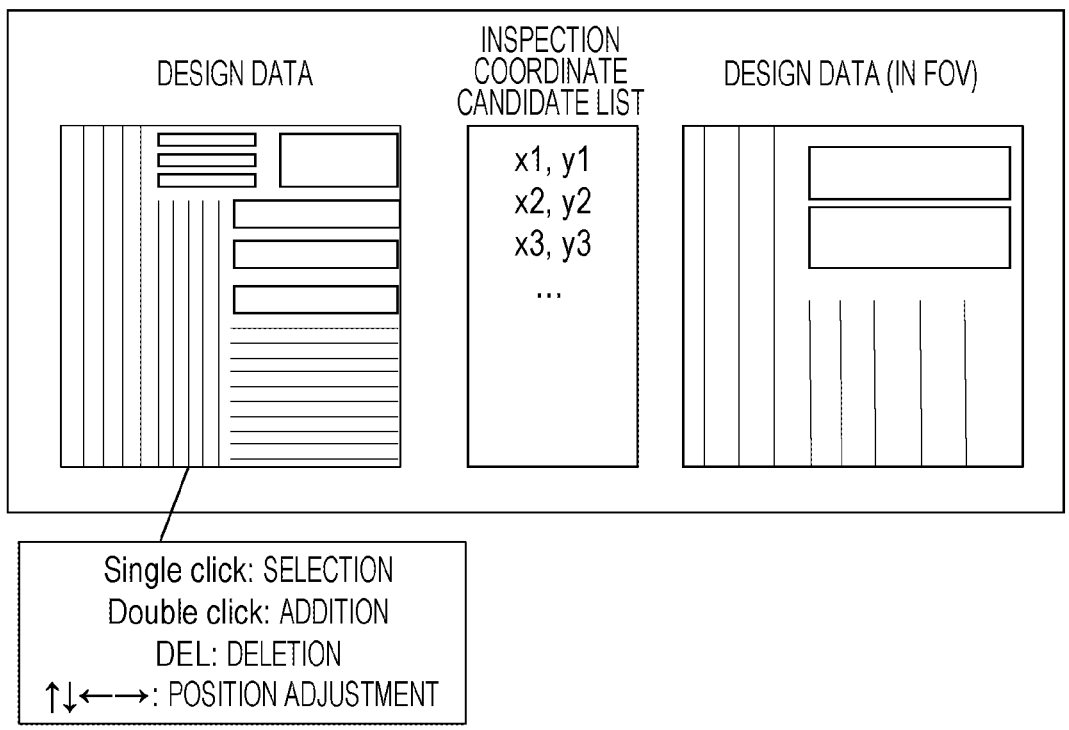
FIG. 12 is a diagram illustrating a display screen example of a GUI of a recipe creation unit illustrated in FIG. 2.
Figure 13:
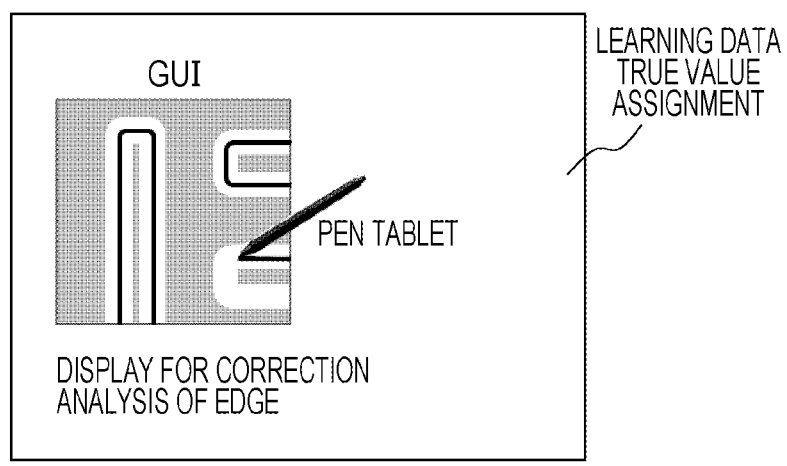
FIG. 13 is a diagram illustrating a display screen example of a GUI of a teaching data creation unit illustrated in FIG. 3 and is a diagram illustrating a state when a true value assignment of learning data is executed.

Next, an image photographing unit 20 will be described. FIG. 2 is a diagram illustrating an outline of the image photographing unit 20 constituting the image generation unit 1 according to the embodiment of the present invention. As illustrated in FIG. 2, the image photographing unit 20 creates a recipe to photograph the SEM by a recipe creation unit 201 from the learning image coordinate list 104, photographs the SEM by a photographing unit 202 based on the created recipe, and stores the photographed SEM in the learning image data storage unit 203. Here, it is conceivable to display the recipe creation unit 201 on the display screen of the GUI as illustrated in FIG. 12 so that the user can confirm the recipe creation unit 201. The design figure based on the design data and the coordinates may be displayed in correspondence with each other, or the coordinate displayed according to the users instruction may be added to or deleted from the learning image coordinate list 104.

Figure 3:
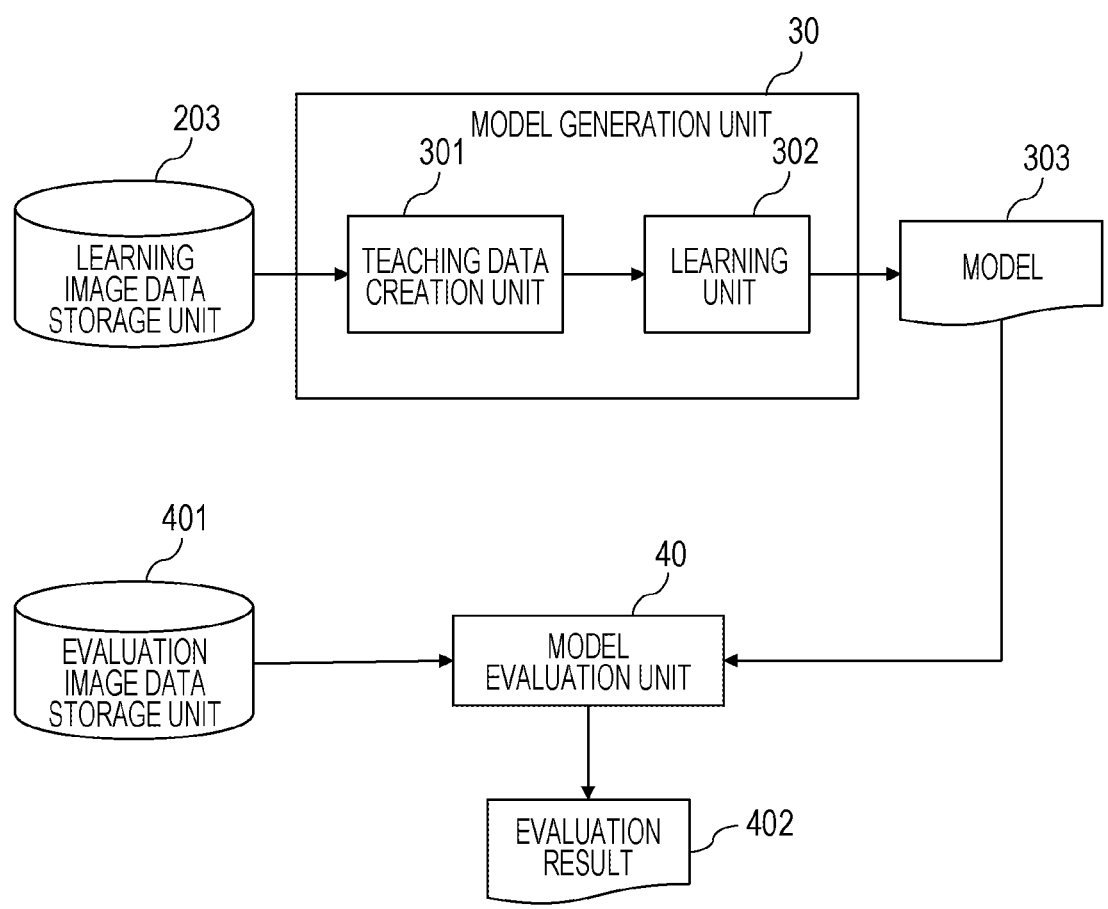
FIG. 3 is a diagram illustrating outlines of a model generation unit and a model evaluation unit.

Subsequently, the model generation unit 30 will be described. FIG. 3 is a diagram illustrating outlines of the model generation unit 30 and the model evaluation unit 40. For the learning image which is stored in the learning image data storage unit 203, the model generation unit 30 causes the user to give corresponding teaching data in the teaching data creation unit 301 for each pixel or for each image. In addition, a learning unit 302 learns a relationship between the learning image and teaching data corresponding to the learning image to create the model 303. The learning unit 302 can be realized by an identifier used in the machine learning. For example, the learning unit 302 can be realized by an identifier based on a multi-layered neural network (that is, CNN) such as deep learning.

As a case where the teaching data for each pixel is required, there is a semantic segmentation by the deep learning. In this task, a label is attached to each pixel of the image. This label means a type of the pixel. The learning unit 302 learns a model which estimates the label for each pixel from the image. For example, in a case where an identifier model for the semiconductor inspection so as to extract the contour line of the circuit pattern from the SEM image of the circuit pattern is created, as an example of the teaching data, teaching data of the image in which the label of an area division is expressed as an 8-bit signal of RGB is created, and in the area division, the pixel of the contour line is red, and other pixels are blue. The teaching data may be created in which the inside, the outside, and the contour line of the pattern are divided and color-coded. In a case where the circuit pattern which is the object crosses a plurality of layers, teaching data may be created, in which the inside, the outside, and the contour line of each layer pattern are finely color-coded. In this case, a learning image based on the learning image coordinate list 104 is displayed on the GUI, and teaching data is superimposed on the image and created while visually being confirmed. Moreover, in a case where detailed teaching data of the contour line or the like is created, it is desirable to create the teaching data using a pen tablet. In a case where the inside, the outside, and the contour line of the pattern for each layer in the plurality of layers are divided and color-coded, it is necessary to determine each color. In a true value assignment of a data set used for learning, the colors corresponding to attributions such as the number (indicating what layer it is) from an upper layer, the inside of the pattern, the outside of the pattern, the contour line, or the like are determined such all data is unified. In addition, even if there are different data sets, there is a possibility that they will be learned together later. In addition, it is not limited to the data set, and for example, in a data set for evaluating the identifier which extracts the contour line, it is desirable to match the correspondences between the attributions and the colors in all the data sets. In this case, by using design data corresponding to the SEM image of the learning data, it is possible to obtain the number of attributions and the types of the attributions (the number of layers, the inside of the pattern, the outside of the pattern, and the contour line of the pattern) required for the true value assignment of the SEM image. As for the number of attributions, if it is the SEM image of a single-layer pattern, there are three attributions of the inside of the pattern, the outside of the pattern, and the contour line of the pattern. Moreover, if it is the SEM image of a two-layer pattern, in first and second layers, there are six attributions in the inside of the pattern, the outside of the pattern, and the contour line of the pattern, and the number of attributions is three times the number of layers. For example, if inner and outer boundaries of the pattern are considered as the contour lines and the true value assignment is applied to only the inside and the outside of the pattern, the number of attributions is two times the number of layers. The color corresponding to the number of the attributions is considered to be arbitrarily determined by the user, and it is desirable to previously determine the color corresponding to the number of the attribution according to the type of the attribution. In this case, the color may be randomly determined, a vivid color may be chosen in a color space such that each color is easily seen, each color may be chosen such that a distance is even in the color space, or the color may be determined such that the distance is the greatest. In addition, it is conceivable that an estimation true value image with a color corresponding to each attribution is created with the inside (pattern region) of the pattern, the outside (non-pattern region) of the pattern, and the boundary as the contour line of the pattern, based on the design data. It is also conceivable that the created estimation true value image is displayed on the display screen, and the user executes the true value assignment with reference to this estimation true value image. In this time, a palette of the colors of all the attributions of the estimation true value image is displayed, and for example, by specifying the color of the palette, a color of a pen of a pen tablet may be the color of the palette.

It is also conceivable to display the estimation true value image displayed on the display screen so as to be superimposed on the SEM image to be subjected to the true value assignment, and process the estimation true value image so as to create a true value image. In this case, it is conceivable that the user moves a portion or one point of the boundary (the contour line) between the pattern and the non-pattern of the estimation true value image to an ideal position of the contour line by the pen table while looking at the SEM image displayed to be superimposed. It is conceivable that a portion of the moving contour line or a point of another contour line continuous to one point is also moved according to the movement. An amount of the movement decreases as the distance from a portion or one point of the contour line instructed by the user increases. In addition, it is conceivable that the boundary between the pattern region and the non-pattern region is also changed according to the moving contour line.

Moreover, in addition to the design data, it is conceivable that the type of attribution and the color corresponding to the number of attributions are determined by process information. In this case, the estimation true value image is created using the design data and the process information. In this case, it is conceivable to separately manage the color of the attribution of a structure such as a via-in-trench in which a via exists in a trench.

In addition, for the true value image data created by the user, a function for thickening or thinning the contour line is provided, and for example, it is conceivable to thicken the contour line of one pixel drawn by the user to three pixels or thin the contour lines of ten pixels to five pixels, depending on the users instruction.

Moreover, it is also conceivable to estimate the contour lines of the SEM image from the design data by simulation in the true value data creation and perform the true value assignment based on the estimation.

Moreover, it is also conceivable to add a mask area as an area outside the learning object. In addition, in a case where a region becoming an identification target is small, the identification performance is improved by changing learning weight. Therefore, in a case where there is a large difference in the type of attribution area which analyzes and identifies the entire data set of true value data created by the user, the learning weight of each attribution is changed depending on the difference. For example, in a case where a ratio of three types of attribution areas in the entire data set is 100:100:1, it is conceivable to change the learning weight of each attribution to 1:1:100.

Here, the entire data set of the true value data created by the user is analyzed. However, it is conceivable that the ratio of the area of each attribution is similarly obtained by analyzing the design data of the entire data set to change the learning weight of each attribution. Moreover, it is conceivable that the user sets the learning weight of each attribution empirically.

In addition, in generation of a defect identifier, it is conceivable that the user color-codes a defect region in the image, performs true value assignment, and learns to create an identifier for detecting the defect region included in the image. In this case, the defect region or a normal region may be color-coded to perform the true value assignment. Hereinbefore, the example which creates a label as a 24-bit signal of RGB is described. However, as long as it is the information in which the identifier can recognize a label, the present invention is not limited to this.

As a case where the teaching data is required for each image, there is an image classification by the deep learning. In this task, a type of image is selected for each image, and a label indicating the type is given as teaching data. A model, which estimates the type of the image from the image, is learned by the learning unit 302. For example, in a case where the model of the identifier which classifies a defect image is learned, the teaching data is created in which information of defect type is tagged for each image. In this case, the learning image based on the learning image coordinate list 104 obtained by the learning data selection unit 103 is displayed on the display screen of the GUI, and the teaching data of the defect type is created while the defect type is visually confirmed.

Here, it is conceivable that the generated model of the identifier is divided into a single layer, a multilayer, or the like. In this case, it is conceivable to select the model of the identifier using the design data. Moreover, when a learning data set is generated, the learning data set may be divided into a single layer, a multilayer, or the like using the design data so as to generate the learning data set.

In addition, similarly, it is conceivable that the learning data set is generated using the process information and the model of the identifier is selected using the process information.

Moreover, it is conceivable to divide the model of the identifier according to a photographing magnification of the SEM image and a frame integration number of the photographing. In this time, it is conceivable to generate the learning data set and select the model using the SEM photographing condition information.

A management of the created model of the identifier creates a model management table indicating a model name and the type of the corresponding model. The type of the model includes the number of layers acquired from the design data corresponding to the learning data set, a process acquired from the process information, the photographing magnification acquired from SEM photographing condition information, the frame integration number, or the like. In addition to these, information that the user wants to add may be included in the type of the model.

When the image data is identified, based on the design data of the image data, the process information, the photographing condition information, and a model management table, it is confirmed whether the model is an applicable model, and in a case of different types of models which cannot be applied, a function of notifying the user to that effect may be provided.

In addition, it is also conceivable to perform identification by searching for a most suitable model among a plurality of models based on the design data of the image data to be identified, the process information, the SEM photographing condition information, and the model management table.

Hereinbefore, the learning image coordinate list 104 is created from the design data 101 and the SEM photographing condition 102, the photographing is performed based on the coordinates, the true value assignment is performed on the obtained image data, and the learning image and teaching data are created.

Figure 14:
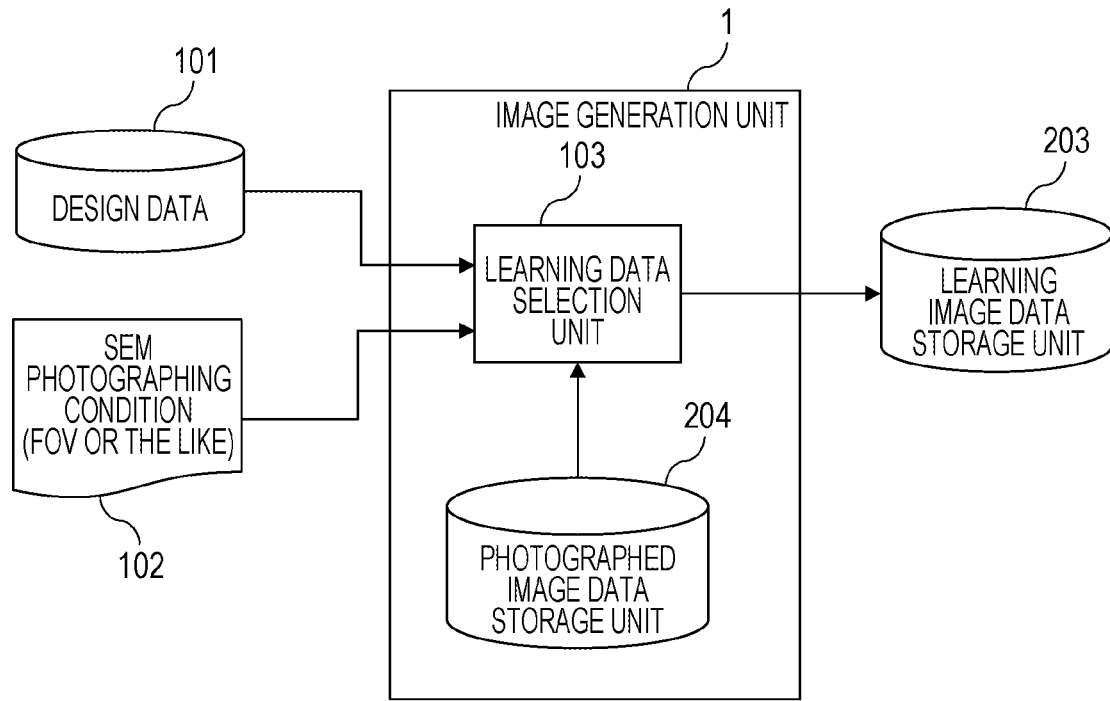
FIG. 14 is a diagram illustrating an outline of an image generation unit according to the embodiment of the present invention.

However, there are cases where it is desirable to select the learning image from the photographed SEM image. Therefore, the outline of the image generation unit 1 for selecting the learning image from the image data already photographed is illustrated in FIG. 14. However, this image generation unit 1 is premised on a presence of the design data 101 and the SEM photographing condition 102 corresponding to the image data already photographed. The inputs are the design data 101 and SEM photographing condition 102, the learning data is selected by the learning data selection unit 103 while these are input, and image data corresponding thereto is extracted from a photographed image data storage unit 204 and stored in the learning image data storage unit 203. The learning data selection unit 103 used here can be realized by substantially the same processing as the above-described learning data selection unit 103. Differences therebetween are that the image to be clipped, the pattern shape to be analyzed, and the coordinate position are limited to the shapes and position coordinates corresponding to the already photographed image. For example, the FOV design data clipping processing in Step S10 of FIG. 4 can be omitted because there is already the clipped design data 101. The following can be realized by limiting the shape and position coordinate corresponding to the already photographed image.

The pattern shape generated by the process fluctuation, such as a deviation of an optimal exposure condition, is changed. It is considered that the pattern shape can be grasped to some extent by changing a width of a white band of the pattern and a degree of a roughness also from the SEM image obtained by photographing the pattern.

As described above, according to the present embodiment, it is possible to provide the pattern inspection system capable of shortening the learning time by saving time and effort on the true value creation operation of the learning data and reducing the amount of the learning data.

Moreover, according to the present embodiment, it is possible to shorten the learning time while maintaining the accuracy of the model 303 (FIG. 22).

Second Embodiment

Figure 15:
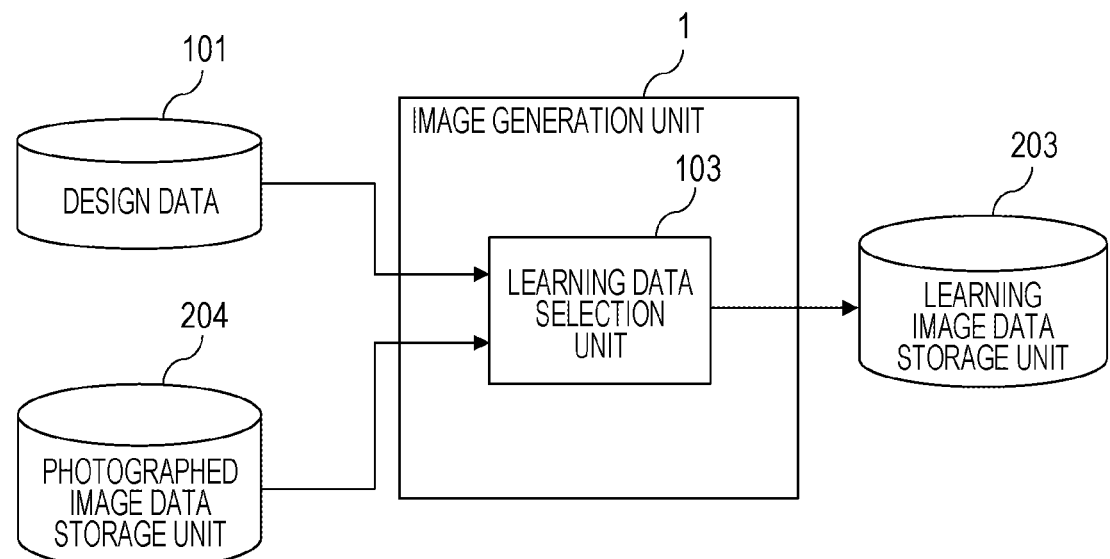
FIG. 15 is a diagram illustrating an outline of an image generation unit according to another embodiment of the present invention.

FIG. 15 is a diagram illustrating an outline of an image generation unit according to another embodiment of the present invention. The present embodiment is different from the first embodiment in that the learning data is selected by the learning data selection unit 103 based on inputs from the design data 101 and the photographed image data storage unit 204. The same reference numerals are assigned to the same components as those of the first embodiment, and hereinafter, repeated descriptions are omitted.

First, in the present embodiment, in a case where there is already acquired image data, the present embodiment is focused on the fact that it is possible to select the learning data using the information of the process variation that has actually occurred from the image data. As illustrated in FIG. 15, the inputs are the design data 101 and the photographed image data storage unit 204, the learning data is selected by the learning data selection unit 103 while these are input, and the image data is stored in the learning image data storage unit 203.

Figure 16:
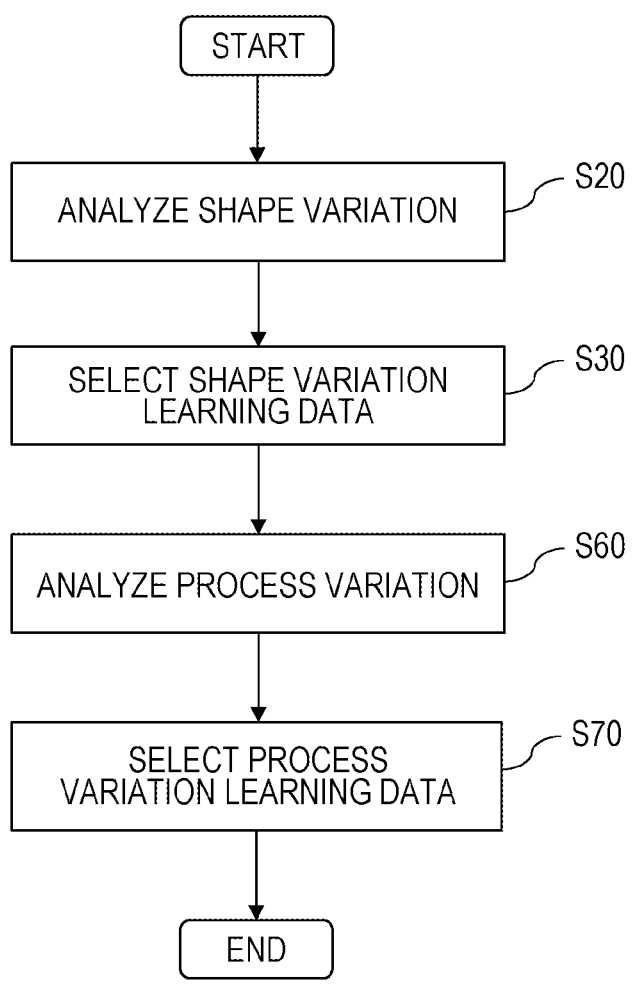
FIG. 16 is a flowchart illustrating a processing flow of a learning data selection unit illustrated in FIG. 15.

FIG. 16 is a flowchart illustrating a processing flow of the learning data selection unit 103 illustrated in FIG. 15. Shape variation analysis processing in Step S20 and shape variation selection processing in Step S30 are the same as those in FIG. 4 of the above-described first embodiment, and descriptions thereof are omitted. Sequentially, in Step S60, the learning data selection unit 103 executes process variation analysis processing. That is, for the SEM image corresponding to the pattern selected in Step S30, the variation due to the process fluctuation is analyzed.

Subsequently, in Step S70, the learning data selection unit 103 executes the process variation learning data selection processing. That is, the learning data is selected based on an evaluation value of the process variation analyzed in Step S60.

Figure 17:
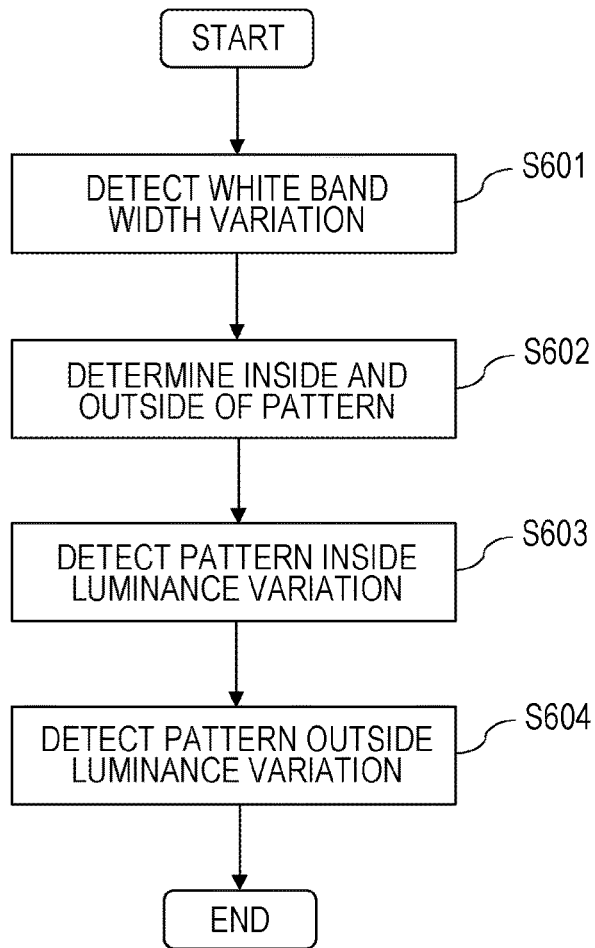
FIG. 17 is a flowchart illustrating a detailed flow of a process variation analysis in Step S60 of FIG. 16.

FIG. 17 is a flowchart illustrating a detailed flow of the process variation analysis in Step S60 of FIG. 16. In Step S601, it is known that the learning data selection unit 103 changes an inclination of a side wall of the pattern depending on the pattern shape or the pattern portion due to the fluctuation of the process, and it is conceivable that the width of the white band of the pattern is changed when the side wall of the pattern is changed. Therefore, white band width variation detection processing is performed to detect a white band width variation as an index for evaluating the variation due to the process fluctuation. The white band width can be detected by calculating the variation of the width of the white region by threshold value binarization in which noise removal is performed on the SEM image by Gaussian filtering or the like and the white band is set to white.

Subsequently, in Step S602, the learning data selection unit 103 executes pattern inside/outside determination processing. That is, the pattern (the inside of the pattern) and the portion other than the pattern (the outside of the pattern) are determined. In this case, alignment can be executed on the SEM image and the design data by pattern matching to detect the inside and the outside of the pattern. Further, the noise removal is performed on the SEM image by Gaussian filtering or the like by utilizing a difference in density between the inside and outside of the pattern, the binarization is realized, and it is possible to determine the inside and outside of the pattern.

Subsequently, in Step S603, the learning data selection unit 103 executes pattern inside luminance variation detection processing. That is, the variation of a luminance value of a region inside the pattern is determined.

Subsequently, in Step S604, the learning data selection unit 103 executes pattern outside luminance variation detection processing. That is, the variation of a luminance value of a region outside the pattern is obtained.

Here, in the white band width variation detection processing (Step S601), the pattern inside luminance variation detection processing (Step S603), the pattern outside luminance variation detection processing (Step S604), the variation of luminance value is obtained. However, instead of the variation of the luminance value, a maximum value and a minimum value of the luminance value may be determined. Further, it may be configured to obtain a variation of roughness, a variation of noise inside and outside the pattern, or the like.

Figure 18:
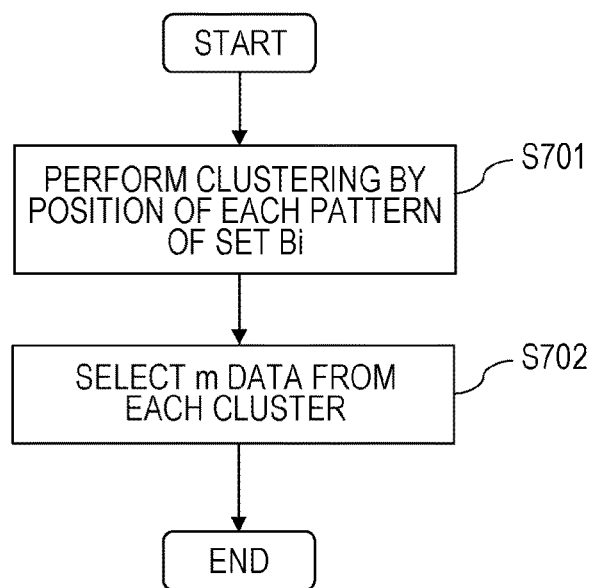
FIG. 18 is a flowchart illustrating a detailed flow of a process variation learning data selection in Step S70 of FIG. 16.

FIG. 18 is a flowchart illustrating a detailed flow of the process variation learning data selection in Step S70 of FIG. 16. In Step S701, the learning data selection unit 103 performs clustering based on the values of the variation of the white band width, the variation of the luminance value of the pattern inside region, and the variation of the luminance value of the pattern outside region detected by the process variation analysis processing (Step S60) for each image of the isomorphic pattern of the pattern shape selected by the shape variation learning data selection processing (Step S30), and divides the clustering into one or more classes. In addition, the clustering can be realized in the same manner as that of Step S301 described above. Subsequently, in Step S702, m (m≥1) pieces of image data are randomly selected from the divided classes. Moreover, the selected image data is stored in the learning image data storage unit 203.

Here, for the SEM image, the variation due to the process fluctuation is analyzed to select the image. However, from the photographing position of the photographing information obtained by photographing the SEM image, similarly using the position variation analysis processing (Step S40) described above, the position on the design data, the position on the semiconductor device, and the position on the wafer are determined, and an image where the variation of the process fluctuation looks large is selected. For example, selecting an image of patterns of photographing positions corresponding to vicinities of a center and four corners on the semiconductor device, selecting an image of patterns of photographing positions corresponding to vicinities of a center and four corners on a wafer, selecting an image of patterns of photographing position corresponding to a position on the wafer where heat from exposure is the highest and a position on the wafer where the heat is the lowest in consideration of lens heating, selecting a distance between the images of the pattern of photographing position to be the longest, or the like is considered.

In addition, for the SEM image of the isomorphic pattern of the pattern shape selected in the shape variation learning data selection processing (Step S30) using the design data, using the photographing information of the SEM image, the SEM image of the pattern of the photographing position is selected using the position variation analysis processing (Step S40) described above from the SEM image photographing position, and thereafter, for the selected SEM image, the variation due to the process fluctuation is analyzed from the variation of the white band width, the variation of the luminance value of the pattern inside region, the variation of the luminance value of the pattern outside region, or the like, and the image in which the variation of the process fluctuation looks large may be carefully selected.

Here, the image data of the photographed image data storage unit 204 (FIG. 15) may be image data obtained by randomly determining and photographing the photographing position in advance, or may be image data obtained by photographing a wafer having photographing positions while being evenly spaced. Moreover, it is also conceivable to use a Focus Exposure Matrix (FEM) wafer in which a circuit pattern is generated by changing the exposure conditions. In this case, it is also considered that the photographing position is a photographing position where images of different exposure conditions can be photographed. In this case, the exposure condition corresponding to the photographing position is known, and thus, the variation of the exposure condition which is one factor of the process fluctuation can be obtained based on the photographing position. In this case, it is desirable to select the image so that a difference in exposure conditions between the images increases.

Compared to the configuration of the first embodiment, according to the above-described present embodiment, the learning data is selected by the learning data selection unit 103 based on the inputs from the design data 101 and the photographed image data storage unit 204, and thus, it is possible to more shorten the learning time.

A portion or all of the processing in the above-described first embodiment or second embodiment may be created by a processing program operated by a general-purpose CPU. In addition, it is also conceivable to execute a portion of all of the above-described processing by a dedicated LSI or FPGA. The above-described design data 101 may be a design drawing of the circuit pattern created by a designer, may be a pattern shape calculated from the SEM image, or may be a pattern shape created by simulation.

The present invention is not limited to the above-described embodiments, but includes various modification examples. For example, the embodiments are described in detail in order to easily explain the present invention, and are not necessarily limited to those having all the configurations described. In addition, a portion of a configuration of an embodiment can be replaced with a configuration of another embodiment, and a configuration of another embodiment can be added to a configuration of an embodiment.

What is claimed is:

1. A pattern inspection system which inspects an image of an inspection target pattern of an electronic device using an identifier constituted by machine learning, based on the image of the inspection target pattern of the electronic device and data used to manufacture the inspection target pattern, the system comprising:
    a data selection unit which selects a photographing coordinate of a learning pattern used in the machine learning, based on information about photographing the electronic device and pattern data used to manufacture a pattern of the electronic device,
    wherein the data selection unit analyzes a shape of a pattern using the pattern data and/or analyzes a position of a pattern on a semiconductor device,
    and wherein,
    the data selection unit detects a position on the pattern data in which the shape of the same pattern exists, using a plurality of patterns having the same shape detected by analyzing a shape of the pattern and the information about photographing the electronic device, and executes statistical processing using at least one of the detected number, a coordinate position on a semiconductor chip, a coordinate position on a wafer, and distance information between the coordinate position on the semiconductor chip and the coordinate position on the wafer, and the detected position.

2. The pattern inspection system according to claim 1, wherein
    the data selection unit executes statistical processing of the number of pixels of a vertical edge and a horizontal edge based on edge information of a pattern obtained pattern data corresponding to the pattern image obtained by photographing the electronic device to derive the same shape.

3. A pattern inspection system which inspects an image of an inspection target Pattern of an electronic device using an identifier constituted by machine learning, based on the image of the inspection target pattern of the electronic device and data used to manufacture the inspection target pattern, the system comprising:
    a data selection unit which selects a photographing coordinate of a learning pattern used in the machine learning, based on information about photographing the electronic device and pattern data used to manufacture a pattern of the electronic device,
    wherein
    the data selection unit divides the pattern data into small areas corresponding to an imaging field of view of the information about photographing the electronic device, analyzes a shape of a pattern for each divided area, and analyzes a position of the pattern on the electronic device based on a pattern having the same shape as the shape of the analyzed pattern to specify the photographing position.

4. The pattern inspection system according to claim 1, further comprising:
    a recipe creation unit which generates a recipe of a photographing unit based on the coordinate selected by the data selection unit.

5. The pattern inspection system according to claim 4, further comprising:
    an identifier generation unit which executes machine learning based on the learning pattern image photographed by the recipe and a true value data corresponding to the learning pattern image so as to generate the identifier.

6. The pattern inspection system according to claim 5, further comprising:
    a region extraction unit which extracts one of a contour shape of at least a pattern, a pattern region, and a non-pattern region from the image of the inspection target pattern by the identifier.

7. The pattern inspection system according to claim 5, wherein
    the identifier extracts a defect based on the image of the inspection target pattern.

8. The pattern inspection system according to claim 5, wherein
    identification data obtained by the identifier and the pattern data used to manufacture the pattern of the electronic device are compared with each other so as to execute inspection.

9. A pattern inspection method for inspecting an image of an inspection target pattern of an electronic device using an identifier constituted by machine learning, based on the image of the inspection target pattern of the electronic device and data used to manufacture the inspection target pattern, the method comprising:
- selecting a photographing coordinate of a learning pattern used in the machine learning, based on information about photographing the electronic device and pattern data used to manufacture a pattern of the electronic device,
- analyzing a shape of a pattern using the pattern data and/or analyzes a position of a pattern on a semiconductor device,
- detecting a position on the pattern data in which the shape of the same pattern exists, using a plurality of patterns having the same shape detected by analyzing a shape of the pattern and the information about photographing the electronic device, and
- executing statistical processing using at least one of the detected number, a coordinate position on a semiconductor chip, a coordinate position on a wafer, and distance information between the coordinate position on the semiconductor chip and the coordinate position on the wafer, and the detected position.

\* \* \* \* \*